United States Patent [19]
Gellekink

[11] 3,794,999
[45] Feb. 26, 1974

[54] NOISE-FIGURE MEASURING CIRCUIT
[75] Inventor: Bernard Gellekink, Hengelo, Netherlands
[73] Assignee: N.V. Hollandse Signaalapparaten, Hengelo, Netherlands
[22] Filed: Apr. 19, 1972
[21] Appl. No.: 245,560

[30] Foreign Application Priority Data
Apr. 20, 1971 Netherlands .................... 7105272

[52] U.S. Cl. ................................ 343/17.7, 325/363
[51] Int. Cl. ........................ G01s 7/40, H04b 15/00
[58] Field of Search .................... 343/17.7; 325/363

[56] References Cited
UNITED STATES PATENTS
| | | | |
|---|---|---|---|
| 3,062,955 | 11/1962 | Hovda et al. | 343/17.7 X |
| 3,072,845 | 1/1963 | Bruck | 325/363 X |
| 3,302,116 | 1/1967 | Free | 325/363 |
| 3,510,768 | 5/1970 | Petersen | 343/17.7 X |

Primary Examiner—Malcolm F. Hubler
Attorney, Agent, or Firm—Frank R. Trifari

[57] ABSTRACT

The invention relates to a noise-figure measuring circuit for the determination of the receiver noise in an operational radar receiver. A comparator is alternatively supplied with the receiver noise and the sum of the receiver noise and the noise signals, which are obtained from a noise source connected to the input of the radar receiver, each pulse repetition period. This comparator converts the noise signals exceeding a certain threshold into standardised noise pulses. The noise-figure measuring circuit comprises two counters which are supplied with the noise pulses derived from the receiver noise and also with the noise pulses derived from the sum of the receiver noise and the noise signals from the noise source. One of the two counters functions as reference counter. If this counter has reached a certain count position, the counters are both blocked, and the ratio of the count positions determines the ratio between the power of the receiver noise and the power of the noise signals from the noise source.

5 Claims, 5 Drawing Figures

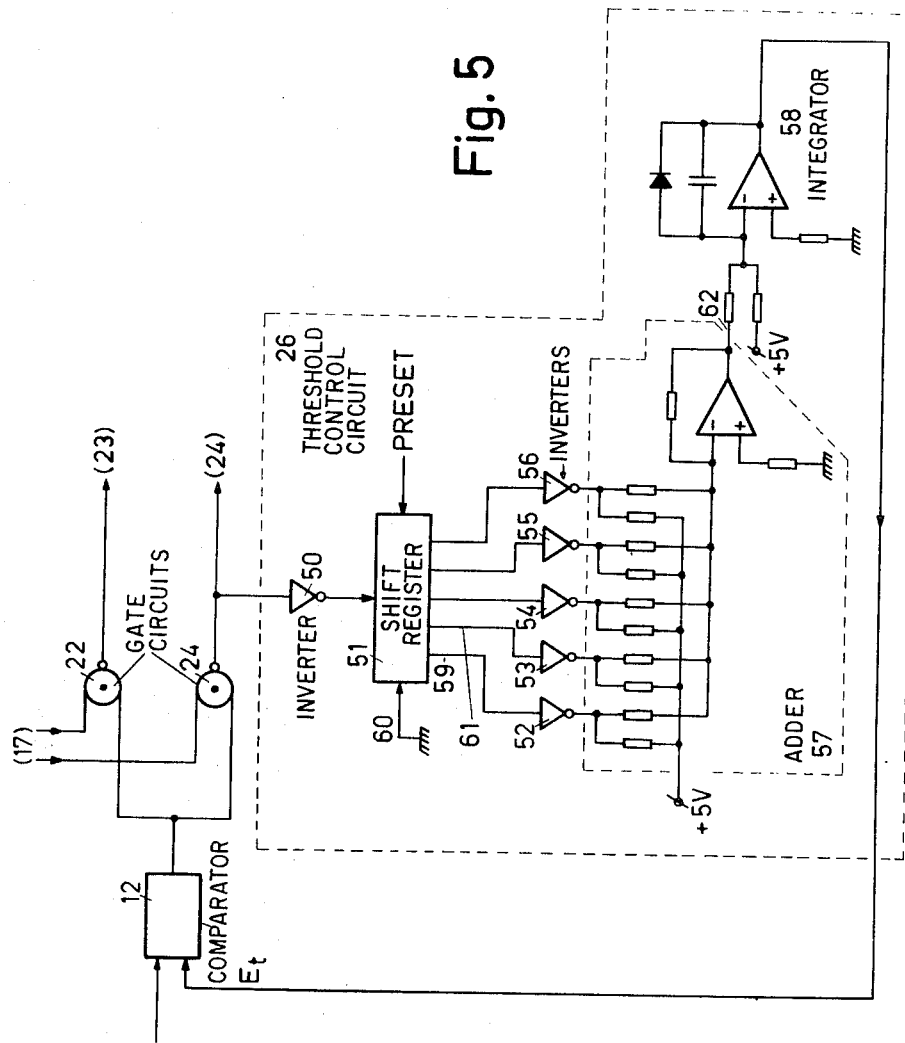

NOISE-FIGURE MEASURING CIRCUIT

The invention relates to a noise-figure measuring circuit for the determination of the receiver noise in an operational radar receiver.

In Skolnik, M.I., Introduction to Radar Systems, McGraw Hill 1962, page 365, the desirability has already been expressed that an operational radar receiver should have some means to monitor automatically and continuously the noise figure and, hence, the sensitivity of the receiver. This would have to be accomplished by inserting a test signal — either an RF pulse or a gated noise signal — into the receiver during the time (dead time) when no echo pulses can be received, and by measuring the energy present at the receiver output after insertion of the test signal and also in the absence of this signal. This measurement should have to be carried out in such a way that the operating personnel are made aware by direct indication of any excessive rise in noise figure or degradation of the receiver sensitivity.

It is the object of the invention to provide a noise-figure measuring circuit that enables, in accordance with the above-mentioned desirabilities, receiver-noise monitoring using a simple and accurate method.

According to the invention, the noise-figure measuring circuit comprises, for this purpose, a comparator which is connected to the radar receiver and which is alternately supplied with the receiver noise and with the sum of the receiver noise and the noise signals, which are obtained from the high-frequency noise source connected to the radar receiver input, each pulse repetition period and within a time interval in which no echo pulses can be received; said comparator converts the supplied noise signals, which exceed a certain threshold value, into standardised noise pulses. The noise-figure measuring circuit is provided with two counters coupled to the comparator; the first counter which is supplied with the noise pulses derived from the receiver noise, and the second counter is fed with the noise pulses derived from the sum of the receiver noise and the noise signals from the noise source, one of the two counters functions as a reference counter which upon the attainment of a predetermined count position becomes blocked and also blocks the other counter the ratio of the count positions determines the ratio between the power of the receiver noise and the power of the noise signals originating from the noise source; furthermore, the other counter not functioning as reference is connected to a decoding and indication system which is provided with a calibrated scale so that the count position of the other counter records the noise present in the radar receiver on said scale.

The invention will now be further explained in conjunction with the accompanying drawings, in which:

FIGS. 4 and 5 depict some detail diagrams illustrating certain parts of the noise-figure measuring circuit shown in a block diagram in FIG. 1.

Figure 1:
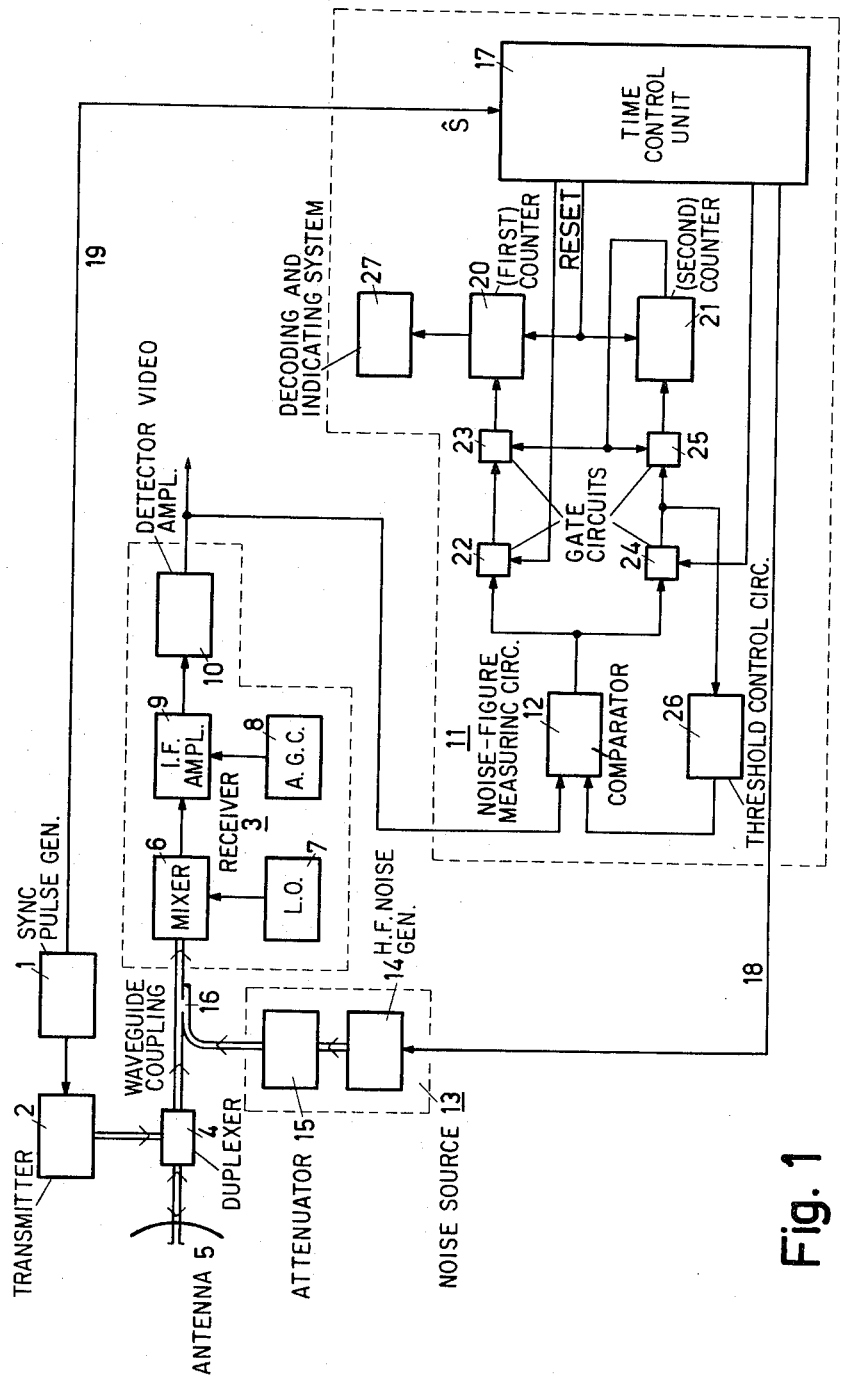
FIG. 1 shows a block diagram of the noise-figure measuring circuit according to the invention and a radar system to which said measuring circuit may be applied.

FIG. 1 shows a pulse radar apparatus which is provided with a noise-figure measuring circuit and which consists of a synchronisation pulse generator 1, a transmitter 2, and a receiver 3. The transmitter and receiver are coupled to an antenna 5 via a duplexer 4. The receiver 3 comprises a mixer 6, a local oscillator 7, an intermediate-frequency amplifier 9 provided with an AGC (Automatic Gain Control) circuit 8, and a detector/video amplifier 10. With the aid of the above-mentioned units the received RF signals are converted into intermediate-frequency signals, amplified and detected in the known way. The video signals so obtained may, for example, be displayed on a PPI.

In order to be able to register the noise power of the receiver automatically and continuously in such a pulse radar apparatus, the output of the receiver 3 is connected to a noise-figure measuring circuit 11. This measuring circuit contains a comparator 12, connected to the output of the receiver 3. The comparator 12 is supplied alternately with the receiver noise and with the sum of the receiver noise and the noise signals, which are obtained from a noise source 13 connected to the input of the radar receiver 3, driving each pulse repetition period and within a time interval in which no echo pulses can be received. Hereinafter, the sum of the receiver noise and the noise signals from the noise source will be designated by sum noise. The noise source 13 is formed by a high-frequency, white-noise generator 14 and an adjustable attenuator 15. The noise energy produced by the noise generator can be fed to the receiver 3 via the waveguide coupling 16.

Figure 2:
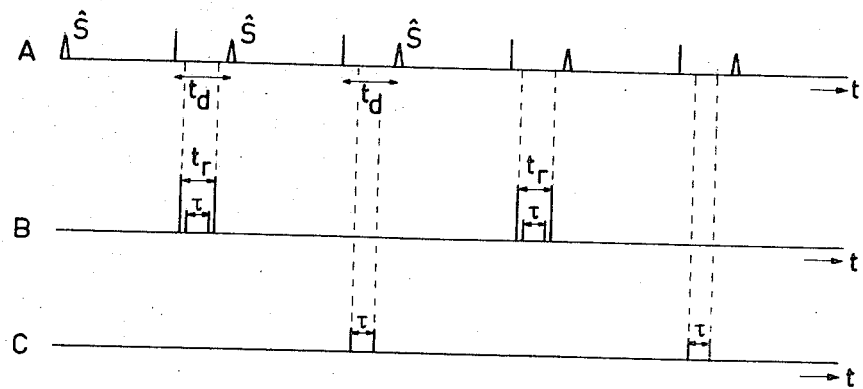
FIGS. 2 and 3 show a number of diagrams for an explanation of the operation of said measuring circuit.

FIG. 2A illustrates a time diagram indicating the times at which the synchronization pulse generator 1 supplies the sync pulses S. The time between two successive sync pulses (pulse repetition time) is such that, after the elapse of a time within which the echo pulses can be received, a certain other time (dead time) will elapse before another sync pulse will be supplied. FIG. 2B indicates the intervals $t_r$, which are within the dead time $t_d$ and during which the noise source 13 is switched on, and also the intervals $\tau$ which are within $t_r$ and during which the sum noise $p_o$ is being processed in the noise-figure measuring circuit. FIG. 2C indicates the alternate intervals $t'$ which are also within the dead time $t_d$ and during which nothing but the receiver noise $N_o$ is being processed in the noise-figure measuring circuit; also the duration of these alternate time intervals $t'$ is $\tau$. A signal supplied by a time control unit 17 and fed via the line 18 switches on the noise source 13 every alternate pulse repetition time during the time interval $t_r$. The correct switching times are determined by the time control unit according to sync pulses fed to this unit 17 from the sync pulse generator 1 via the line 19.

The receiver noise No and the sum noise Po are alternately processed in the noise-figure measuring circuit during a time $\tau$. If the detector used in the receiver 3 is employed as a phase-sensitive detector, the probability that the value of a detected noise sample lies between the voltage values $x$ and $x + dx$ can be indicated by the relationship:

$$d P(x) = 1/\sigma \sqrt{2\pi} \exp(-X^2/2\sigma^2) \, dx$$

and the probability that a detected noise sample exceeds a certain threshold $E_t$ may be given by $$P(x) = \frac{1}{\sigma\sqrt{2\pi}} \int_{E_t}^{\infty} \exp\left(-\frac{x^2}{2\sigma^2}\right) dx$$

In these relationships it has been assumed that the mean noise level at the receiver output be zero; the distribution in the above Gaussian relationships is indicated by $\sigma$. Nevertheless, if the detector in the radar receiver provides a d.c. voltage component of the value $\mu$, then the noise is distributed as $N(\sigma, \mu)$. The threshold value should then be increased by the same value $\mu$. The probability that a detected sum noise sample and a detected receiver noise sample exceed a threshold value $E_t$, can therefore be expressed in an analogue way by the relationships:

$$P(Po) = \frac{1}{\sigma_{Po}\sqrt{2\pi}} \int_{E_t}^{\infty} \exp\left(-\frac{x^2}{2\sigma_{Po}^2}\right)dx$$

$$P(No) = \frac{1}{\sigma_{No}\sqrt{2\pi}} \int_{E_t}^{\infty} \exp\left(-\frac{x^2}{2\sigma_{No}^2}\right)dx$$

The comparator 12, of which the comparator voltage corresponds to the threshold $E_t$ in the above relationships, converts the noise signals exceeding this threshold into standardised noise pulses. The noise-figure measuring circuit further comprises a first counter 20 coupled to the comparator 12. The first counter 20 is fed with the standardised noise pulses derived from the receiver noise No, and a second counter 21 also coupled to the comparator 12. The second counter 21 is fed with the standardised noise pulses derived from the sum noise Po. One of the two counters functions as reference counter so that, in case this reference counter has reached a predetermined count position at which the two counters have been blocked, the ratio of the count positions determines the ratio between the power of the receiver noise and the power of the noise signals originating from the noise source 13. In this example the second counter 21 functions as a reference counter. There are two gate circuits 22 and 23 between the comparator 12 and the counter 20 and another two gate circuits 24 and 25 between the comparator and the second counter 21. The noise pulses derived from the receiver noise $N_o$ pass the gate circuit 22 every alternate pulse repetition period during a time interval $\tau$. The noise pulses derived from the sum noise $P_o$ pass the gate circuit 24 every other pulse repetition period also during a time interval $\tau$. The two gate circuits 22 and 24 are controlled by control signals supplied by the time control unit 17. The gate circuits 23 and 25 are disabled when the second or reference counter 21 has reached a predetermined count position and they will not be opened until the two counters are reset.

The noise pulses passed through the gate circuit 24 are also fed to a threshold control circuit 26 connected to one input of comparator 12. This threshold control circuit sets the threshold voltage $E_t$ supplied to the comparator to such a value that a fixed mean number of noise pulses are fed to the reference counter 2 during the time $\tau$.

The above-mentioned relationship, which expresses the probability that a detected sum noise sample exceeds the value $E_t$ or the probability that a detected sum noise sample is converted into a noise pulse to be fed to the reference counter 21, may be rewritten as:

$$P(Po) = \frac{1}{\sqrt{2\pi}} \int_{\frac{E_t}{\sigma_{Po}}}^{\infty} \exp\left(-\tfrac{1}{2}y^2\right)dy$$

Since the value $E_t$ will be so selected that a specific mean number ($n$) of noise pulses is fed to the reference 21 counter during the said time interval $\tau$, P(Po) will be constant, or $$E_t/\sigma_{Po} = \alpha.$$

The constant $\alpha$ is determined by the requirement that $n$ noise pulses appear during the time $\tau$. The probability that a detected receiver noise sample exceeds the value $E_t$, or the probability that a detected receiver noise sample is converted into a noise pulse to be fed to the counter 20, may now be expressed by the relationship:

$$P(No) = \frac{1}{\sqrt{2\pi}} \int_{\alpha \cdot \frac{\sigma_{Po}}{\sigma_{No}}}^{\infty} \exp\left(-\tfrac{1}{2}y^2\right)dy$$

At the moment the two counters are blocked the mean count position of the first counter 20 is inversely proportional to the mean time between two successive receiver noise samples exceeding the threshold. The two counters are disabled when the second or reference counter 21 has reached a predetermined count position. Obviously, also this count position is inversely proportional to the mean time between two successive sum noise samples exceeding the threshold. Since the mean time between two successive noise samples exceeding the threshold is also inversely proportional to the probability that a noise sample exceeds this threshold, the ratio between the mean count position of the counter 20 (to be denoted by $\overline{No-t}$) and the position of the counter 21 (to be denoted by $\overline{Po-t}$) is equal to the ratio between P(No) and P(Po), or $$\overline{No-t} = \overline{Po-t} \times P(No)/P(Po).$$

The above shows that $\overline{No-t}$ is proportional to P(No); the proportionality constant is determined by $\overline{Po-t}$ and P(Po). If the ratio between the effective sum noise voltage $\sigma_{Po}$ and the effective receiver noise voltage $\sigma_{No}$ is transformed to a ratio between effective sum noise energy Po(E) and effective receiver noise energy No(E), then:

$$\overline{No-t} = C \cdot \int_{k}^{\infty} \exp\left(-\tfrac{1}{2}y^2\right)dy$$

where C is the above-mentioned proportionality constant and $k = \alpha \sqrt{Po(E)}/No(E)$. The effective sum noise energy is the sum of the effective receiver noise energy No(E) and the effective noise source energy So(E). Hence, the mean count position of the counter 20 is a measure for the ratio between the energy from the noise source and the receiver noise energy.

The counter 20 is connected to a decoding and indication system 27 which is provided with a calibrated scale so that the position of the counter 20 records the noise present in the radar receiver on this scale.

It should be noted that the end count position of the reference counter 21 must be sufficiently large, and therefore the total count time required must be sufficiently long, in order that the distribution in the contents of the counter 20 is below a predetermined value. This value must be so small that the read position, instead of the mean position, of the counter 20 can be taken as a measure for the ratio between So(E) and No(E).

Figure 3:
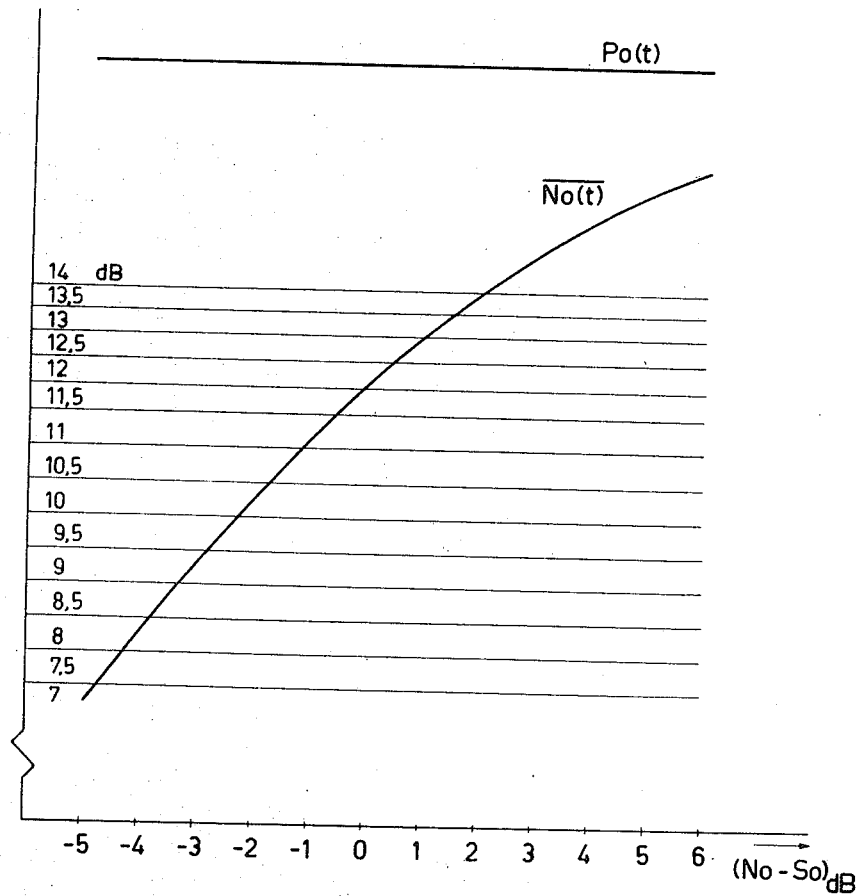

FIG. 3 indicates the position of the counters 20 and 21 subject to the ratio between No(E) and So(E). Here, use is made of the calibrated scale (vertical axis) which gives the noise figure as 12 dB in the case $No(E) = So(E)$. The condition by which $No(E) = So(E)$ can be set by means of the adjustable attenuator 15.

Figure 4:
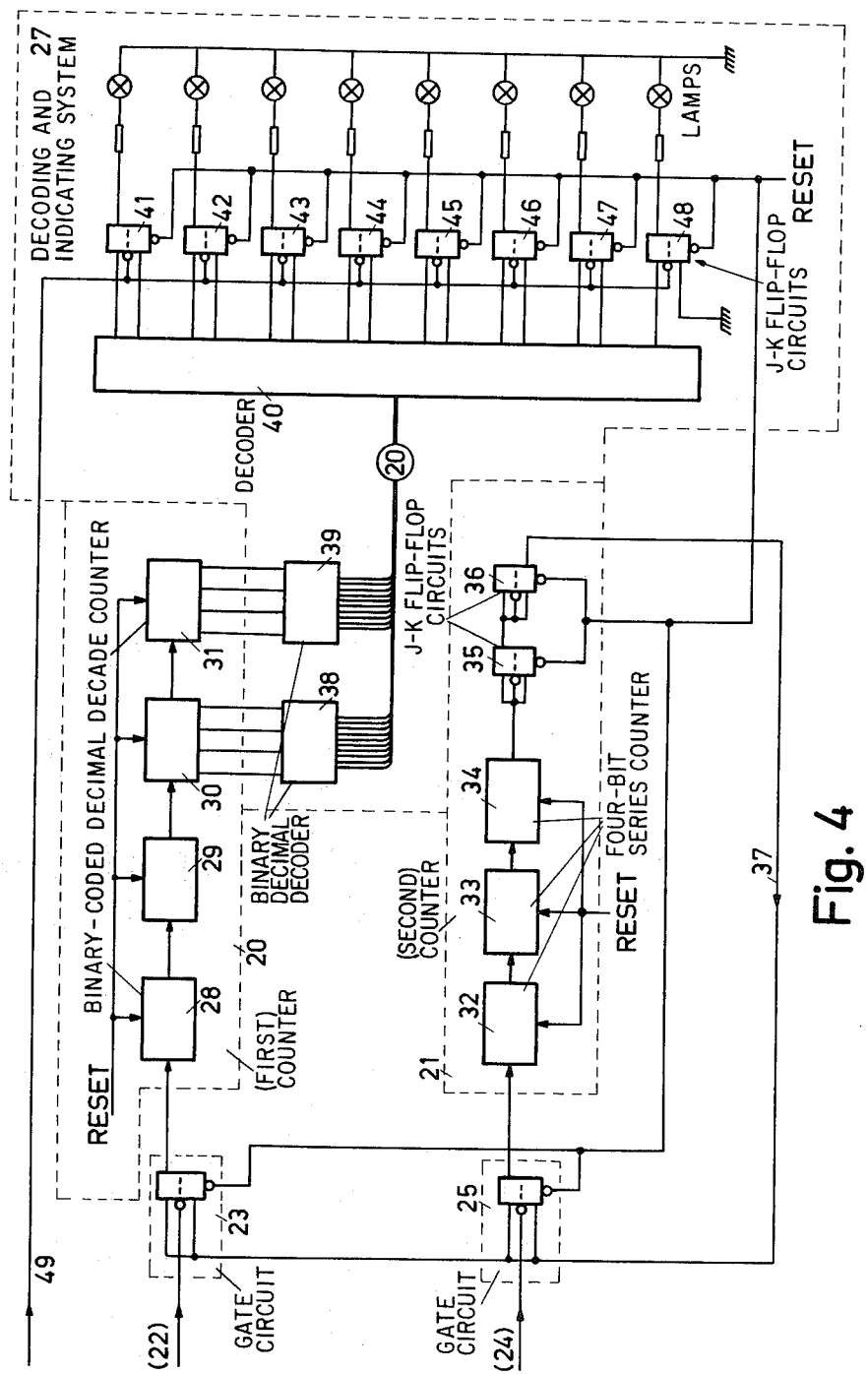

FIG. 4 shows a part of the noise-figure measuring circuit in detail. Here, the counter 20 is composed of four binary-coded decimal decade counters 28, 29, 30 and 31, the counter 21 of three four-bit series counters 32, 33 and 34, followed by two J-K flip-flop circuits 35 and 36. The gate circuits 23 and 25 are each formed by a J-K flip-flop circuit. As long as the counter 21 has not reached its maximum count position, the two gate circuits 23 and 25 are kept in the open state with the aid of a signal supplied via the line 37 by the flip-flop circuit 36. At the moment the counter 21 has reached its maximum count position, the flip-flop circuit 36 switches over and the voltage on the line 37 changes in such a way that the two gate circuits 23 and 25 are disabled.

The decoding and indication system 27 connected to the counter 20 comprises two binary decimal decoders 38 and 39 connected to counters 30 and 31, a decoder 40 connected to the outputs of both binary decoders 38 and 39, and eight J-K flip-flop circuits 41-48 connected to the latter decoder 40. The outputs of these flip-flop circuits are connected to lamps which will light if the respective flip-flop outputs are at the binary voltage value of "1." The lamp panel is provided with a calibrated scale.

The binary-coded decimal decade counters 30 and 31 count the hundreds and the thousands respectively, which information is processed by the decoder 40 in such a way that the count range is divided into intervals and each of the flip-flop circuits 41-48 connected to the decoder 40 corresponds to one of these intervals. When a lamp connected to the respective flip-flop lights up, this thus implies that the position of the counter 20 lies within a certain interval. A signal provided by the decoder 40 cannot change the state of the corresponding flip-flop circuit until a suitable signal is applied via the line 49. This signal originates from the time control unit 17.

In the case a noise-figure measurement has occurred and the result has been read on the lamp panel, the gates 23 and 25 can again be opened, the counters 20 and 21 and also the flip-flop circuits 35, 36, 41-48 can be reset and a following measurement started.

FIG. 5 indicates the threshold control circuit 26 in detail. This figure also shows the two gates 22 and 24 which are used as NAND gates. The output of the NAND gate 24 is fed to an inverter 50 of the threshold control circuit. The threshold control circuit also includes a shift register 51 connected to the output of inverter 50, the inverters 52-56 each connected to an assigned output of the shift register 51, the adder 57 coupled to respective outputs of inverters 52-56 and an integrator 58 connected to the adder 57. The standardised noise pulses derived from the sum noise Po are fed to the shift register 51 during a time interval $\tau$ and in such a way that, if one noise pulse is received in the time $\tau$, only the shift register output 59 becomes low, that is, the output 59 will be "O," expressed in binary form. This is accomplished by the action of the applied noise pulse which is used as clock pulse in order to write the binary value "O," supplied via the line 60, into the shift register. Prior to this, this register should be preset. If a second noise pulse is received within the time $\tau$, the "O" will be shifted one place and two shift-register outputs 59 and 61 will be at "O." In the applied design, a maximum of five noise pulses can be written in the register during the time $\tau$. However, this raises no objections at all, since the threshold control circuit in the design in question has been set to an average registration of two noise pulses per time interval $\tau$. The voltages at the shift register outputs are then in inverters 52-56, added in adder 57 and fed to the integrator 58. The integrator has been so set that, if the point 62 is subjected to a voltage corresponding to two received noise pulses, i.e. approximately $-5V$ in the design in question, the output voltage of the integrator remains constant, and hence no control-voltage correction will be performed. On the other hand, if the number of noise pulses received is greater than two, the threshold voltage $E_t$ should be increased; here, the output voltage deviation of the summing amplifier with respect to the $-5V$ is a measure for the correction current for the integrator.

The description is based on a phase-sensitive detector with a Gaussian distribution of the noise present at the input of the noise-figure measuring circuit. However, also other detectors may be used in the radar receiver. For example, if a linear detector is used, the probability that the value of a detected noise sample lies between $x$ and $x + dx$, according to the Rayleigh distribution, is represented by $$d\,P(x) = x/\sigma^2 \exp(-x^2/2\sigma^2)\,dx$$

The probability that a detected sum noise sample and a detected receiver noise sample exceed a threshold $E_t$ may then be expressed by the relationships:

$$P(Po) = \exp\left(-\frac{E_t^2}{2\sigma_{Po}^2}\right)$$
$$P(No) = \exp\left(-\frac{E_t^2}{2\sigma_{No}^2}\right)$$

Similar to the case in which a phase-sensitive detector was used, also in this case it can be derived that the means position of the counter 20 can be expressed by $$\overline{No\cdot t} = C \exp(-\alpha^2 \cdot So(E)/No(E))$$

and that, hence, the position of the counter 20 determines the ratio between the noise source energy and the receiver noise energy. It will be clear that here the same noise-figure measuring circuit can be applied as in the case where the radar receiver comprises a phase-sensitive detector; however, the lamp panel must be provided with a different scale. The noise-figure measuring circuit is therefore independent of the applied detector and thus also independent of the type of pulse radar apparatus in which it is used.

In the design in question the noise-figure measuring circuit is connected to the detector/video amplifier. The application of the measuring circuit at intermediate-frequency level will still be maintained; the difficulty in the latter case is, however, that the comparator must remain operational at a considerably higher rate.

It should be noted that it is immaterial which counter 20 or 21 is used as reference counter. As it has been explained, the sum noise and the receiver noise are supplied to the noise-figure measuring circuit alternately. Since the total count time is sufficient and, consequently, also the number of times that the sum noise and the receiver noise are processed during a time $\tau$, it is also sufficient, for example, to process the sum noise in five successive pulse repetition periods and, after this, the receiver noise in an equal number of times. In the latter case it should be ensured that the intermediate-frequency amplification in the radar receiver remains sufficiently constant for at least ten successive periods.

What we claim is:

1. A circuit for measuring the receiver noise present in a receiver of a pulse radar, comprising a noise source connected to the input of said receiver; a comparator connected to the output of the receiver, means for supplying the receiver noise to the comparator for a time interval within one pulse repetition period during which no echo pulses are received, and alternately, for supplying the comparator during a similar time interval within a subsequent pulse repetition period, with the sum of the receiver noise and the noise signals from said noise source; means for applying a threshold level to said comparator, said comparator converting the supplied noise amplitudes which exceed said threshold level, into standardized noise pulses; a first counter coupled to said comparator for counting the noise pulses derived from the receiver noise; a second counter coupled to said comparator for counting the noise pulses derived from the sum of the receiver noise and the noise signals; and means for blocking both counters when one counter has attained a predetermined count position whereby the count position of the other counter is indicative of the receiver noise.

2. A circuit according to claim 1 further including decoding and indicating means coupled to said other counter to convert its count position into a calibrated indication of the noise figure.

3. A circuit as claimed in claim 1, wherein a first gate circuit is provided between the comparator and the first counter and a second gate circuit between the comparator and the second counter and wherein said means for supplying includes a time control unit operable for switching the noise source into operation every alternate pulse repetition period during the time interval when no echo pulses can be received, and simultaneously for closing the first gate circuit and opening the second gate circuit for a count time which lies within the time interval when the noise source is operational, and, respectively, for opening the first gate circuit and and closing the second gate circuit every other pulse repetition period for a duration corresponding to said count time.

4. A circuit as claimed in claim 3, further including a third gate circuit and a fourth gate circuit inserted between the first and second gate circuits and the first and second counters, respectively, whereby after the other counter has reached a predetermined count position, the third and fourth gate circuits are closed, and means for resetting the two counters and opening said third and fourth gate circuits.

5. A circuit as claimed in claim 4, wherein said means for applying a threshold level includes a threshold control unit controlled by the noise pulses which have passed the second gate circuit, and operable to set the threshold voltage applied to the comparator in such a way that a fixed mean number of noise pulses are fed to the other counter each count time.

* * * * *